Jan. 15, 1924.

C. G. BAILEY 1,480,651

CAMERA SUPPORT

Filed April 17, 1922

Inventor
C. G. Bailey.

By *Lacey & Lacey*, Attorney

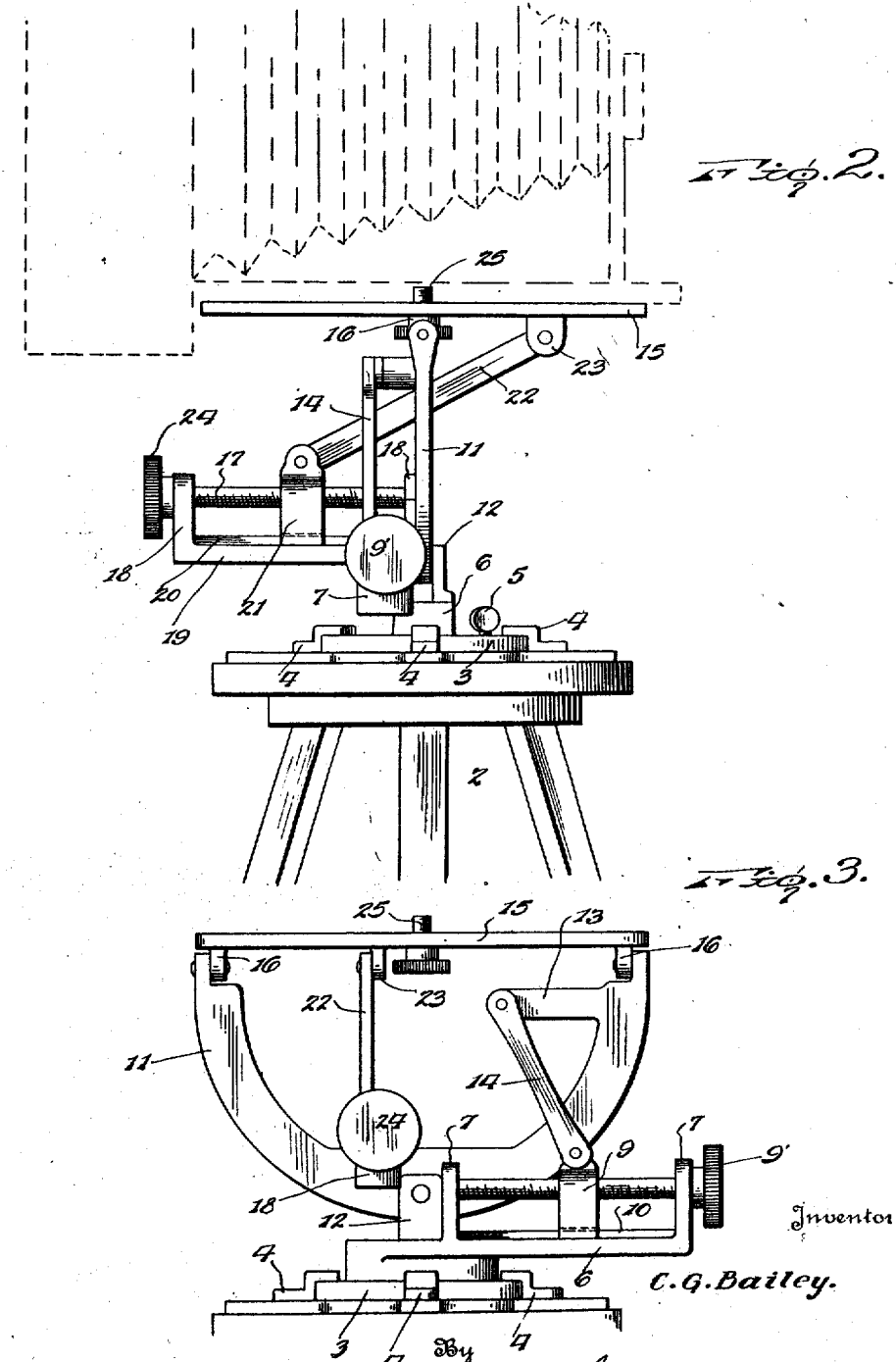

Patented Jan. 15, 1924.

1,480,651

UNITED STATES PATENT OFFICE.

CHARLES G. BAILEY, OF YORK, PENNSYLVANIA.

CAMERA SUPPORT.

Application filed April 17, 1922. Serial No. 553,545.

*To all whom it may concern:*

Be it known that I, CHARLES G. BAILEY, a citizen of the United States, residing at York, in the county of York and State of Pennsylvania, have invented certain new and useful Improvements in Camera Supports, of which the following is a specification.

My invention relates to means for supporting a camera and has for its object the provision of a support which will firmly hold the camera and will permit it to be readily brought into any desired position as the exigencies of the work may require. My camera support is intended primarily for use in connection with cameras used in commercial work in which it is frequently necessary to tilt the camera as well as to move it to either side, and the object of my invention is to provide means of simple and compact form whereby the camera may be adjusted to any desired angle in both vertical and horizontal planes. Another object of the invention is to provide a camera support capable of the stated adjustments which may be very easily secured in any set position.

The invention is illustrated in the accompanying drawings, in which—

Fig. 2 is a side elevation, a camera being indicated by dotted lines and a portion of the upper end of a tripod being shown;

Fig. 3 is a view similar to Fig. 2, the view point being at right angles to that of Fig. 2;

Figure 1:
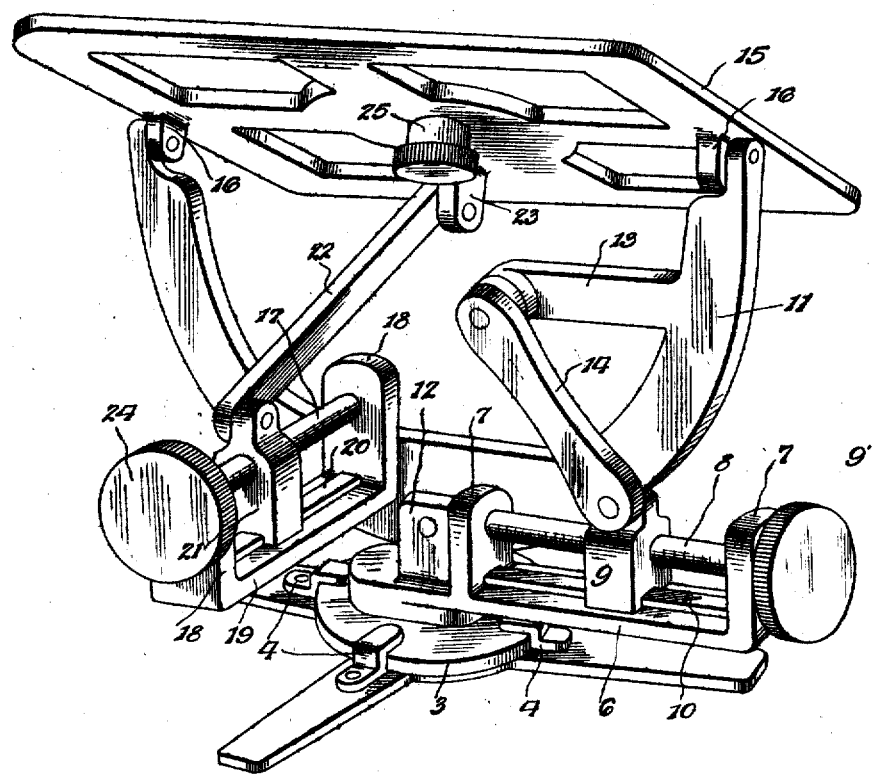
Figure 1 is a perspective view of my improved camera support.
Figure 4:
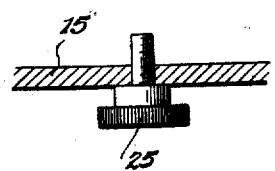
Fig. 4 is a detail section of the means for securing the camera to the support.

In carrying out my invention, I employ a base 1 which may be secured to the top of a tripod or other support 2 in any preferred manner. This base plate 1 must be rigid and should be of sufficient area to prevent contact with the adjusting devices while the operator or other persons may be moving about. Upon the upper side of the base 1 and at the center of the same, I place a turntable 3 which is a flat circular plate held to the base 1 by overhanging brackets 4, as clearly shown. The keepers or brackets 4 are, of course, arranged concentrically about the center of the turntable so that the table will be held to the base plate but may be shifted to any desired extent about its own vertical axis. A set screw 5 is carried by the turntable and is adapted to be turned home through the same so as to bind upon the base plate 1 and thereby secure the turntable in any set position. Formed integral with or otherwise rigidly connected with the turntable and projecting radially therefrom is an arm 6 which is provided with upstanding lugs 7 in which is rotatably fitted a screw or threaded rod 8 having a milled head 9' at its outer end. The inner end of the screw is prevented, by any convenient means, from movement through the lug 7 in which it is journaled so that rotation of the screw will not affect its position relative to the carrying arm 6, and, between the lugs 7, a nut 9 is fitted to the screw so that rotation of the screw will effect movement of the nut logitudinally of the carrying arm. To prevent swinging of the nut, a rib or tongue 10 is provided longitudinally upon the arm 6 and this rib or tongue engages a correspondingly shaped groove in the lower end of the nut. Disposed parallel with the arm 6 and the screw or adjusting rod 8 thereon is a substantially U-shaped frame 11 which has its intermediate portion disposed between guide lugs 12 rising from the inner extremity of the arm 6 over the turntable. The guiding lugs 12 may be equipped with a set screw if so desired, which set screw will bind against the frame 11 and thereby hold it in a set position. Projecting inwardly from one side of the frame 11 near the upper end thereof is an arm or bracket 13 and to the inner end of this arm or bracket is pivoted the upper end of a link 14 which has its lower end pivotally attached to the upper end of the nut 9. It will be readily seen that rotation of the adjusting screw 8 will cause the nut 9 to slide along the arm 6, and this movement will effect a vertical rocking movement of the frame 11 so that it will be tilted in a vertical plane parallel with the adjusting screw.

The camera-carrying plate 15 may be of any preferred form and dimensions and it is provided on its under side with depending lugs or ears 16 which are pivotally connected to the upper extremities of the frame or plate 11. The camera-carrying plate will, of course, be caused to follow the adjustment of the plate or frame 11 and will thus be brought into a horizontal position in one direction or given any desired inclined position. The pivotal connection between the camera-carrying plate and the ends of the frame or plate 11 will permit the camera-carrying plate to be adjusted pivotally at a right angle to the supporting frame and to effect this pivotal movement of the camera-carrying plate upon the said frame 11, I provide an adjusting screw 17 which is similar in all respects to the adjusting screw 8 but is arranged at a right angle to the latter and is mounted in the lugs 18 rising from a carrying arm 19 which is secured to the side of the frame 11, as shown. A longitudinal rib or tongue 20 is provided upon the arm 19 and engages a groove in the lower end of the nut 21, as shown and as will be readily understood. A link 22 is pivoted to the upper end of the nut 21 and extends upwardly therefrom across the plane of the frame 11 and is pivoted to a lug 23 on the under side of the camera-carrying plate. A milled head 24 is provided upon the outer end of the adjusting screw 17, and it will be readily seen that rotation of the said screw will effect movement of the nut 21 along the arm 19, and this movement will be transmitted through the link 22 so as to tilt the camera-carrying plate about its pivotal connection with the frame 11. I am thus enabled to set the camera at any desired angle or bring it quickly into a true horizontal plane so that the machine or other article to be photographed may be viewed from any desired point. Various views of the object may be taken without shifting the position of the tripod and without necessitating great changes in the focus of the camera. The camera is secured firmly to the plate 15 by a clamping set screw 25 which is inserted upwardly through the camera-carrying plate to engage in a threaded socket in the camera frame, as will be readily understood.

My camera support is very simple in the construction of its parts, is compact in its arrangement, may be easily adjusted, and by its use a very quick and accurate setting of the camera may be accomplished.

Having thus described the invention, what is claimed as new is:

1. In a camera support, the combination of a turntable, a carrying arm rigid with and projecting radially from the turntable, a camera-carrying frame arranged over the turntable and having a pendent member, fixed guides upon the turntable engaging opposite sides of said pendent member to prevent relative lateral movement of the camera-carrying frame, and means mounted upon the carrying arm and operatively connected with the camera-carrying frame for angularly adjusting the said frame and effecting movement of the pendent member between said guides.

2. In a camera support, the combination of a turntable, a carrying arm rigid with and projecting laterally from the turntable, a nut slidable on said arm, an adjusting screw rotatably fitted on the arm and engaging said nut whereby to adjust the same longitudinally of the arm, a camera-carrying frame arranged over the turntable, and a link pivoted at one end upon the said nut and at its opposite end to the camera-carrying frame.

3. In a camera support, the combination of a turntable, a carrying arm extending laterally from the turntable, a vertical frame arranged over the turntable and parallel with the said arm, a camera-carrying plate secured to the upper end of the same frame, means for adjusting the camera-carrying plate pivotally relative to the frame, a nut slidably mounted upon the carrying arm, link connections between said nut and said frame, and means for shifting the nut longitudinally of the carrying arm.

4. In a camera support, the combination of a turntable, a vertically arranged frame disposed above the turntable, an arm projecting radially from the turntable, a nut slidably mounted upon the said arm, means for adjusting the nut longitudinally of the arm, a link connecting said nut with the said frame, a camera-carrying plate pivotally connected to the upper ends of the frame, an arm projecting laterally from the frame, a nut slidably mounted on said arm, means for adjusting the nut longitudinally of the arm, and a link connecting said nut with the camera-carrying plate.

5. In a camera support, the combination of a turntable, a vertical frame arranged over the turntable, a camera-carrying plate pivotally connected to the upper end of said frame, adjusting devices arranged at right angles to each other, one of said devices extending laterally from the said vertical frame and the other of said devices being fixed to the turntable and projecting laterally therefrom, operative connections between the last-mentioned adjusting device and the said vertical frame, and operative connections between the other adjusting device and the camera-carrying plate.

6. In a camera support, the combination of a pivotally mounted camera-carrying member, an arm below said member having lugs rising therefrom, a nut slidably mounted on the arm between the lugs, an adjusting screw rotatably fitted in the lugs and engaged through the nut to effect sliding movement thereof, and a link pivoted at its lower end to said nut and at its upper end to the camera-carrying member, whereby sliding of the nut will effect tilting of the camera-carrying member.

In testimony whereof I affix my signature.

CHARLES G. BAILEY. [L. S.]

Witness:
M. DECKMAN.